US007970600B2

(12) United States Patent
Chen et al.

(10) Patent No.: US 7,970,600 B2
(45) Date of Patent: Jun. 28, 2011

(54) USING A FIRST NATURAL LANGUAGE PARSER TO TRAIN A SECOND PARSER

(75) Inventors: John T. Chen, Beijing (CN); Ming Zhou, Beijing (CN); Tianlei Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 860 days.

(21) Appl. No.: 10/980,646

(22) Filed: Nov. 3, 2004

(65) Prior Publication Data

US 2006/0095250 A1     May 4, 2006

(51) Int. Cl.
   *G06F 17/20*     (2006.01)
   *G06F 17/21*     (2006.01)
   *G06F 17/27*     (2006.01)

(52) U.S. Cl. .................................. 704/9; 704/1; 704/10
(58) Field of Classification Search .................. 704/9, 1, 704/10
See application file for complete search history.

(56) References Cited

U.S. PATENT DOCUMENTS

| | | | |
|---|---|---|---|
| 4,811,210 A | | 3/1989 | McAulay |
| 4,914,590 A | | 4/1990 | Loatman et al. |
| 5,060,155 A | * | 10/1991 | van Zuijlen ................ 704/9 |
| 5,068,789 A | * | 11/1991 | van Vliembergen ......... 704/9 |
| 5,193,192 A | | 3/1993 | Seberger |
| 5,371,807 A | * | 12/1994 | Register et al. ............. 382/159 |
| 5,649,215 A | | 7/1997 | Itoh |
| 5,687,384 A | | 11/1997 | Nagase |
| 5,696,980 A | | 12/1997 | Brew |
| 5,937,190 A | | 8/1999 | Gregory et al. |
| 6,098,042 A | | 8/2000 | Huynh |
| 6,182,029 B1 | | 1/2001 | Friedman |
| 6,353,824 B1 | | 3/2002 | Boguraev et al. |
| 6,446,081 B1 | | 9/2002 | Preston |
| 6,473,730 B1 | | 10/2002 | McKeown et al. |
| 6,675,159 B1 | | 1/2004 | Lin et al. |
| 6,681,206 B1 | | 1/2004 | Gorin et al. |
| 6,714,939 B2 | | 3/2004 | Saldanha et al. |
| 6,795,808 B1 | | 9/2004 | Strubbe et al. |
| 6,895,430 B1 | | 5/2005 | Schneider |
| 6,963,831 B1 | * | 11/2005 | Epstein ..................... 704/9 |
| 7,158,930 B2 | | 1/2007 | Pentheroudakis et al. |
| 7,386,438 B1 | | 6/2008 | Franz et al. |

(Continued)

FOREIGN PATENT DOCUMENTS

EP     0387226 A1     12/1990

(Continued)

OTHER PUBLICATIONS

Shlomo Argamon, Ido Dagan, and Yuval Krymolowski 1998, A memory-based approach to learning shallow natural language patterns. In Proceedings of the 17$^{th}$ International Conference on Computational Linguistics and the 36$^{th}$ Annual Meeting of the Association for Computational Linguistics, pp. 67-73, Montreal, Canada.

(Continued)

*Primary Examiner* — Eric Yen
(74) *Attorney, Agent, or Firm* — Joseph R. Kelly; Westman, Champlin & Kelly, P.A.

(57) ABSTRACT

A computer-implemented method for developing a parser is provided. The method includes accessing a corpus of sentences and parsing the sentences to generate a structural description of each sentence. The parser is trained based on the structural description of each sentence.

11 Claims, 7 Drawing Sheets

U.S. PATENT DOCUMENTS

| | | | |
|---|---|---|---|
| 7,571,157 | B2 | 8/2009 | Chowdhury et al. |
| 2001/0041980 | A1 | 11/2001 | Howard et al. |
| 2002/0046018 | A1 | 4/2002 | Marcu et al. |
| 2002/0095445 | A1 | 7/2002 | AlSafadi et al. |
| 2002/0128821 | A1 | 9/2002 | Ehsani et al. |
| 2003/0036900 | A1 | 2/2003 | Weise |
| 2003/0046087 | A1 | 3/2003 | Johnston et al. |
| 2003/0130837 | A1 | 7/2003 | Batchilo et al. |
| 2003/0182102 | A1 | 9/2003 | Corston-Oliver et al. |
| 2003/0200077 | A1 | 10/2003 | Leacock et al. |
| 2003/0212543 | A1 | 11/2003 | Epstein et al. |
| 2003/0233224 | A1 | 12/2003 | Marchisio et al. |
| 2004/0024739 | A1 | 2/2004 | Copperman et al. |
| 2004/0030540 | A1 | 2/2004 | Ovil et al. |
| 2004/0044952 | A1 | 3/2004 | Jiang et al. |
| 2004/0059564 | A1 | 3/2004 | Zhou |
| 2004/0059574 | A1 | 3/2004 | Ma et al. |
| 2004/0102957 | A1 | 5/2004 | Levin |
| 2004/0111253 | A1 | 6/2004 | Luo et al. |
| 2004/0181389 | A1 | 9/2004 | Bourigault et al. |
| 2005/0027512 | A1 | 2/2005 | Waise |
| 2005/0076037 | A1 | 4/2005 | Shen |
| 2005/0086592 | A1 | 4/2005 | Polanyi et al. |
| 2005/0137848 | A1* | 6/2005 | Proux .............................. 704/4 |
| 2005/0222837 | A1 | 10/2005 | Deane |
| 2005/0234707 | A1* | 10/2005 | Luo et al. ........................ 704/9 |
| 2005/0273314 | A1 | 12/2005 | Chang et al. |
| 2006/0074634 | A1* | 4/2006 | Gao et al. ........................ 704/9 |
| 2006/0095250 | A1 | 5/2006 | Chen et al. |
| 2006/0277028 | A1 | 12/2006 | Chen et al. |

FOREIGN PATENT DOCUMENTS

| | | |
|---|---|---|
| EP | 1209560 A1 | 5/2002 |

OTHER PUBLICATIONS

Michael Collins, 1999, Head-Driven Statistical Models for Natural Language Parsing, Ph.D. thesis, University of Pennsylvania, Daniel Gildea 2001. Corpus variation and parser performance. In Proceedings of the Sixth Conference on Empirical Methods in Natural Language Processing (EMNLP-01), Pittsburgh, PA.

Adwait Ratnaparkhi. 1996. A maximum entropy model for part-of-speech tagging. In Proceedings of the Conference on Empirical Methods in Natural Language Processing, pp. 133-142, Somerset, NJ.

Daniel Gildea, "Corpus Variation and Parser Performance" University of California, Berkeley and International Compute Science Institute, 1997.

Adam Berger, Stephen A. Della Pietra and V. Della Pietra, 1996: "A Maximum Entropy Approach to Natural Language Processing" Association for Computational Linguistics, IBM T.J. Watson Research Center, Yorktown Heights, NY, vol. 22, No. 1, Computational Linguistics.

Eugene Charniak, "A Maximum-Entropy-Inspired Parser", Brown Laboratory for Linguistic Information Processing, Dept. of Computer Science, Providence, RI.

Rebecca Hwa, 1999. "Supervised grammar induction using training data with limited constituent information" In Proceedings of the 37th Annual Meeting of the Association for Computational Linguistics, pp. 73-79, College Park, MD.

Miles Osborne. 2002. "Shallow parsing using noisy and non-stationary training material" Journal of Machine Learning Research, 1(1):695-719.

Fernando Pereira and Yves Schabes. 1992. "Inside-outside re-estimation from partially bracketed corpora" In Proceedings of the 30th Annual Meeting of the Association for Computational Linguistics, pp. 128-135, Newark, DE.

Judita Preiss. 2003. "Using grammatical relations to compare parsers" In Proceedings of the 10th Conference of the European Chapter of the Association for Computational Linguistics.

Robbert Prins and Gertjan van Noord. 2001. "Unsupervised POS-tagging improves parsing accuracy and parsing efficiency". In Proceedings of the Seventh International Workshop on Parsing Technologies, pp. 154-165, Beijing, China.

Brian Roark and Michiel Bacciani. 2003. Supervised and unsupervised PCFG adaptation to novel domains. In Proceedings of HLT-NAACL 2003, pp. 205-212, Edmonton, Alberta, Canada.

Mark Steedman, Miles Osbourne, Anoop Sarkar, Stephen Clark, Rebecca Hwa, Julia Hockenmaier, Paul Ruhlen, Steven Baker and Jeremiah Crim. 2003. "Boot-strapping statistical parsers from small datasets" In Proceedings of the 11th Conference of the European Chapter of the Association for Computational Linguistics, Budapest, Hungary.

Alexander Yeh. 2000. "Comparing two trainable grammatical relations finders" In Proceedings of the 18th International Conference on Computational Linguistics (COLING 2000), pp. 1146-1150, Saarbruecken, Germany.

U.S. Appl. No. 11/142,703 Office Action mailed Apr. 2, 2010. 18 pages.

U.S. Appl. No. 11/142,703 Office Action mailed Nov. 16, 2009. 11 pages.

U.S. Appl. No. 11/142,703 Office Action mailed May 8, 2009. 10 pages.

U.S. Appl. No. 11/142,703 Office Action mailed Oct. 10, 2008. 9 pages.

Tashiro et al. "Efficient Chart Parsing of Speech Recognition Candidates", IEEE International Conference on Acoustics, Speech, and Signal Processing, vol. II, Apr. 19-22, 1994, II/13-II/16.

Emami et al., "Extract Training on a Neural Syntactic Language Model", EEE International Conference on Acoustics, Speech, and Signal Processing, vol. 1, May 17-21, 2004, 1245-1248.

U.S. Appl. No. 11/142,703 Office Action mailed Dec. 20, 2007. 22 pages.

Sabine Nicole Buchholz. 2002 Memory-based Grammatical Relations Findings, PhD. thesis, Tilbuerg University. 232 pages.

Michael Collins. 1996. A new statistical parser based on bigram lexical dependencies. In Proceedings of the 34th Annual Meeting of the Association for Computational Linguistics. pp. 184-191.

Rebecca Hwa. 1999. Sample Selection for statistical parsing. Computational Linguistics, 30(3). 39 pages.

Mark Johnson and Stefan Riezler. 2000. Exploiting auxiliary distributions in stochastic unification-based grammars. In Proceedings of the 38th Annual Meeting of the Association for Computational Linguistics, Hong Kong, China.

Mitchell Marcus, Beatrice Santorini, et al. 1993. Building a large annotated corpus for English: the penn treebank. Computational Linguistics, 19(2):313-330.

Ming Tang et al. 2002. Active Learning for Statistical Natural Language parsing. In Proceedings of the 40th Annual Meeting of the Assoc. for Comp. Linguistics, Philadelphia, PA. 8 pages.

Mark Steedman et al. 2003a. Example Selection for bootstrapping statistical parses. In Proceedings of the Joint Conference of Human Language Technologies and the Annual Meeting of the North American Chapter of the Association for Computational Linguistics, pp. 236-243, Edmonton, Canada.

Xun, E. Zhou et al. 2000. A Unified Statistical Model for the Identification of English Based NP. In the 38th Annual Meeting of the Association for Computational Linguistics, Hong Kong, Oct. 3-6. 8 pages.

Chen, Office Action mailed Nov. 1, 2010 for U.S. Appl. No. 11/142,703, filed Jun. 1, 2005.

\* cited by examiner

The park closes tonight.

S -> NP VP
NP -> D N
VP -> VP NP
VP -> V
NP -> N
D -> The
...

USING A FIRST NATURAL LANGUAGE PARSER TO TRAIN A SECOND PARSER

BACKGROUND OF THE INVENTION

The present invention generally relates to natural language processing. More particularly, the present invention relates to developing a parser for use in natural language processing.

Parsing assigns a structural description, typically in the form of a parse tree or a dependency tree, to a given sentence. A parsed sentence can be used in a variety of natural language processing applications including information retrieval, writing assistance, machine translation, questioning/answering, searching, and the like. Current parsers are trained using statistical or machine learning approaches on hand-annotated corpora. Hand-annotation of corpora requires a large amount of time and expense. Since hand-annotated corpora are expensive to generate, developing a parser based on automatic generation of training data would provide a parser that is less costly to develop and/or maintain.

SUMMARY OF THE INVENTION

A computer-implemented method for developing a parser is provided. The method includes accessing a corpus of sentences and parsing the sentences using a pre-existing parser to generate a structural description of each sentence. Subsequently, there can be a deterministic method which does not rely on any human input or labor to transform the resulting structural descriptions into training data. This training data is used directly to train the parser.

DETAILED DESCRIPTION OF ILLUSTRATIVE EMBODIMENTS

The present invention deals with developing a parser for natural language processing. More specifically, the present invention deals with utilizing output from a first parser to train a second parser. However, prior to discussing the present invention in greater detail, one exemplary environment in which the present invention can be used will be discussed.

Figure 1:
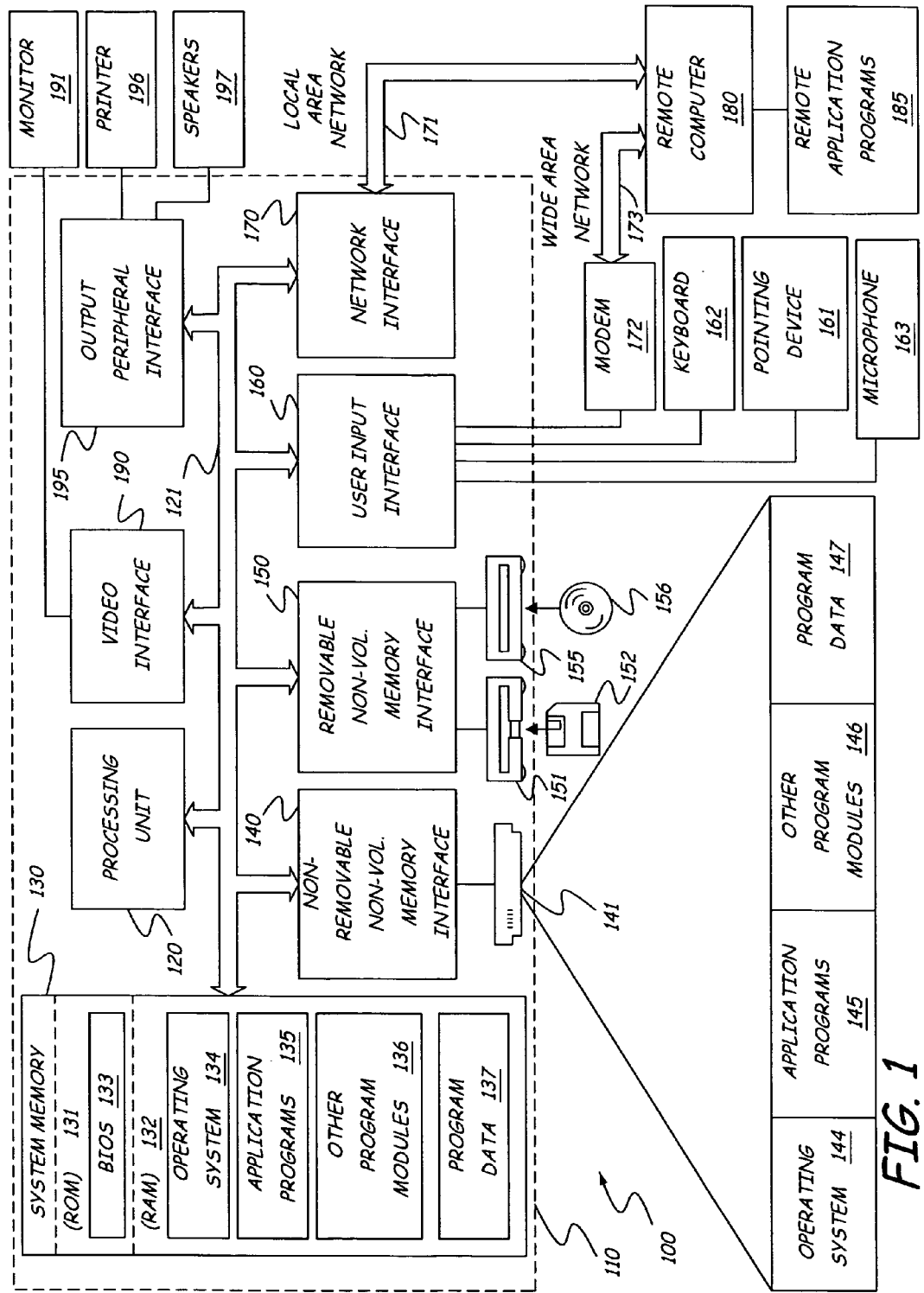
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Figure 2:
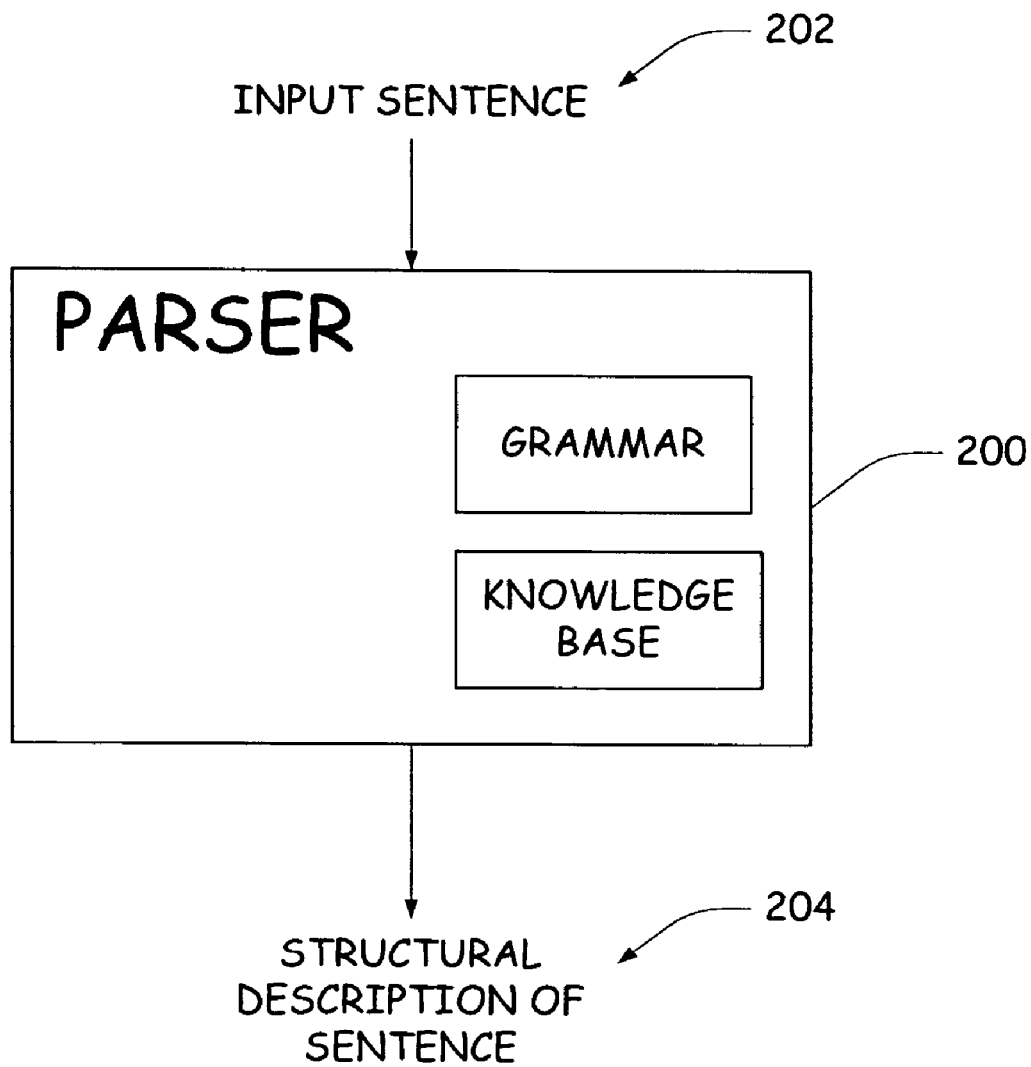
FIG. 2 is a block diagram of a parser.

FIG. 2 is a block diagram of an exemplary parser in accordance with an embodiment of the present invention. Parser 200 accepts, as input, an input sentence 202 and outputs a structural description of the sentence 204. One way of representing the structural description is through a parse tree. Parser 200 utilizes a grammar and a knowledge base in order to output the structural description 204.

Figures 3A, 3B, 3C:
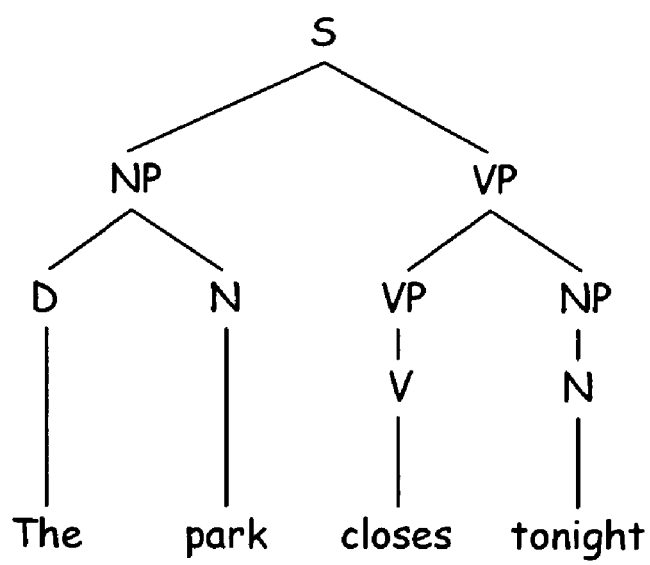
FIG. 3A is an exemplary sentence.
FIG. 3B is an exemplary grammar.
FIG. 3C is an exemplary parse tree.

FIGS. 3A-3C illustrate a simplified example for parsing a sentence. FIG. 3A illustrates an exemplary input sentence, "The park closes tonight." Parser 200 can access a grammar, such as that illustrated in FIG. 3B, which is a set of rules that describes the valid structural descriptions that can be assigned to any given input sentence. FIG. 3B is an example of a set of rules that comprise a particular context-free grammar. For example, a sentence, denoted as "S" can be formed of a noun phrases, denoted as "NP" and a verb phrase, denoted as "VP". Using the grammar in FIG. 3B, parser 200 can output a structural description as that illustrated in FIG. 3C, given as input the sentence that is illustrated in FIG. 3A. In FIG. 3C, each word of the sentence is provided in a parse tree having information pertaining to the part of speech and relation to other words. In case the grammar specifies that more than one structural description corresponds to the input sentence, parser 200 may access a knowledge base in order to select one structural description to be output out of the set specified by the grammar.

There are several different options for developing a parser. One option is to develop a parser as a rule-based or statistical parser. A rule-based parser is typically based on a human generated grammar. A statistical parser is typically based on a human annotation of a corpus of parse trees. Unlike rule-based parsers, statistical parsers have been shown to be more accurate when parsing sentences from complex domains such as newspaper text. However, the statistical parser generally provides less detail about the corresponding sentence structure. Another option is to develop a full or shallow parser. A full parser explores all parse trees while a shallow parser explores a subset of parse trees. The shallow parser is faster, but the output is less detailed.

In accordance with the present invention, a shallow statistical parser is developed and trained using parsed data that is output from a pre-existing parser. This parser in itself requires less human labor than the more prevalent alternative of having a human hand-parse the data. The shallow parser in question can be referred to as a "skeleton" parser, because output from the parser is restricted to being either subject-verb or verb-object relationships. We define "skeleton relations" as these kinds of relationships. They are valuable in determining importance of words and subject matter of a sentence. Furthermore, limiting the skeleton parser to output only skeleton relations makes it more accurate, because it is trained directly on the output of a pre-existing parser, and pre-existing parsers generally output skeleton relations with higher accuracy than other kinds of relations.

Figure 4:
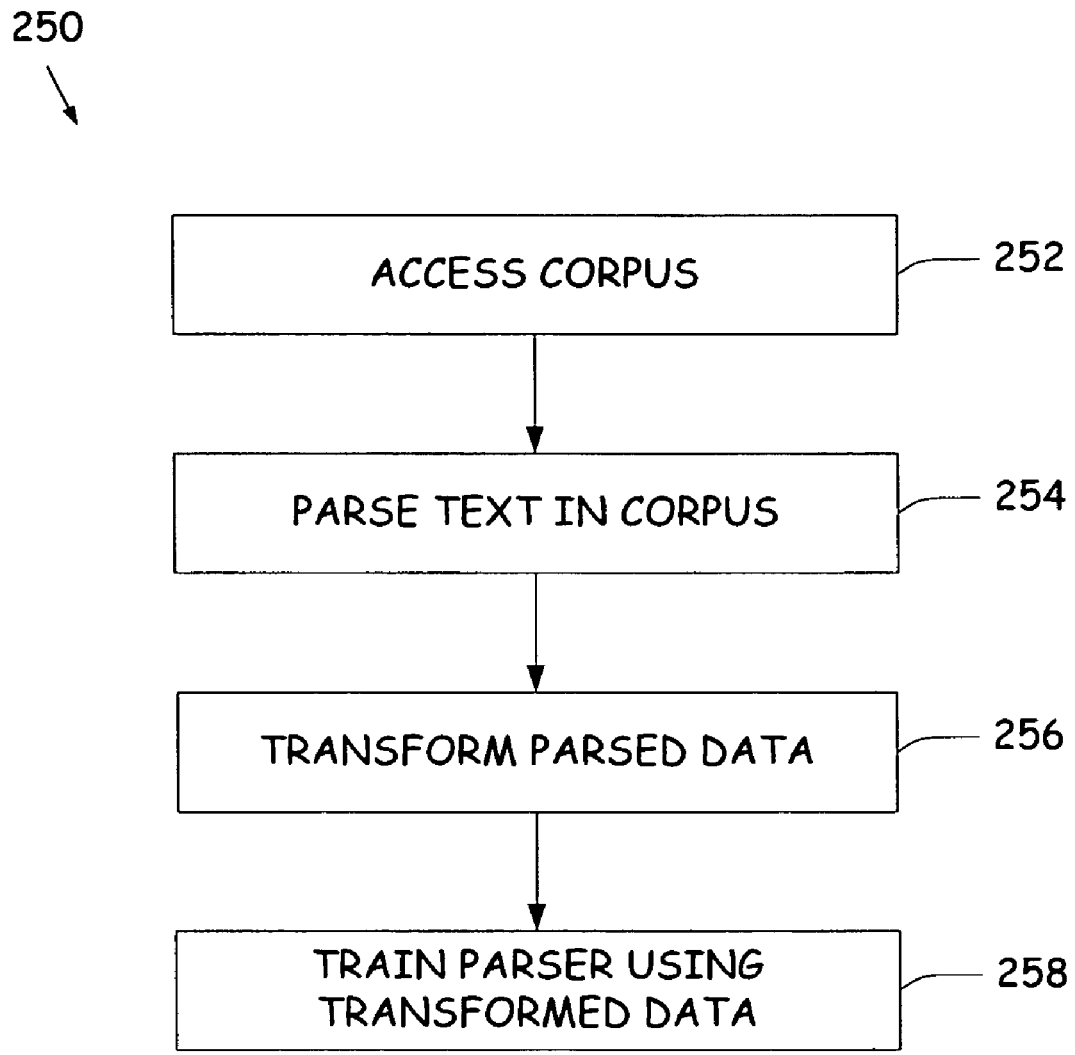
FIG. 4 is a flow diagram of a method for training a parser.

FIG. 4 is an exemplary method for training a skeleton parser using training data developed using a pre-existing parser. Method 250 includes step 252, wherein a corpus is accessed. The corpus can include any sort of natural language text, organized as a set of sentences. At step 254, each sentence in the corpus is parsed using the pre-existing parser, resulting in a set of parses. Each parse is a structural description of the corresponding sentence in the corpus. One example of a pre-existing parser is EZParse, developed by Alchemy Software Development, Ltd. of Dublin, Ireland.

EZParse is a hand-crafted parser with a statistical component. Hand-crafted components include an augmented context-free grammar and a knowledge base with morphological, lexicographic, and semantic information. The statistical component guides a search algorithm that is used by the parser. The input to EZParse is parsed in a cascaded manner with morphological, syntactic chunk, surface syntactic, and semantic information.

Figure 5A:
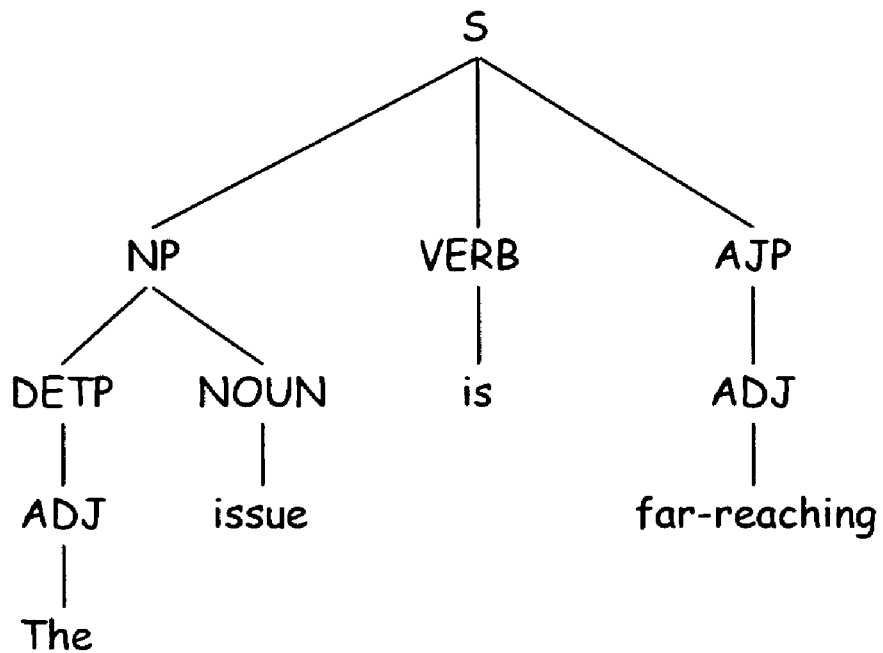
FIGS. 5A-5B are exemplary parse trees.
Figure 5B:
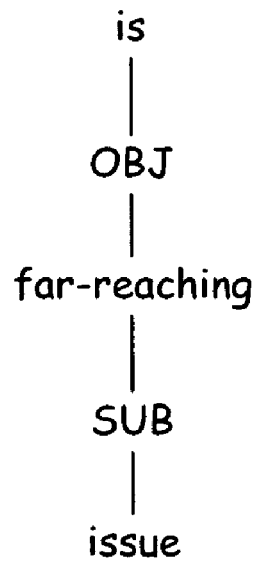

FIGS. 5A-5B illustrate two exemplary outputs of the EZParse parser for the sentence, "The issue is far reaching." FIG. 5A outputs what is known as a portrait of the sentence. The portrait is a syntactic tree where nodes are annotated with feature structures. A feature structure for a node in portrait contains a set of syntactic information describing the node. An example of one kind of syntactic information is the node label, such as "S", "NP", and "VERB", as seen in FIG. 5A. A feature structure can contain other syntactic information as well, although these are not shown in FIG. 5A. Parsers can vary according to the style of parse tree that is output given a particular input sentence. EZParse's portrait annotates NPs as more detailed structures (more levels of structure) compared with the spectrum of other extant parsers, while annotating Ss and VPs as flatter structures.

FIG. 5B outputs what is known as the logical form for the sentence. The logical form is a semantic graph that is also annotated with feature structures. In this case, the feature structures may contain deep syntactic information, including for example information about the existence of deep syntactic subjects and deep syntactic objects in the sentence. These feature structures can also include other kinds of information such as named entity and semantic information.

Using the parsed data, data is transformed at step 256. Transformation is further described with respect to FIG. 6. At step 258, the parser is trained using the transformed data.

Figure 6:
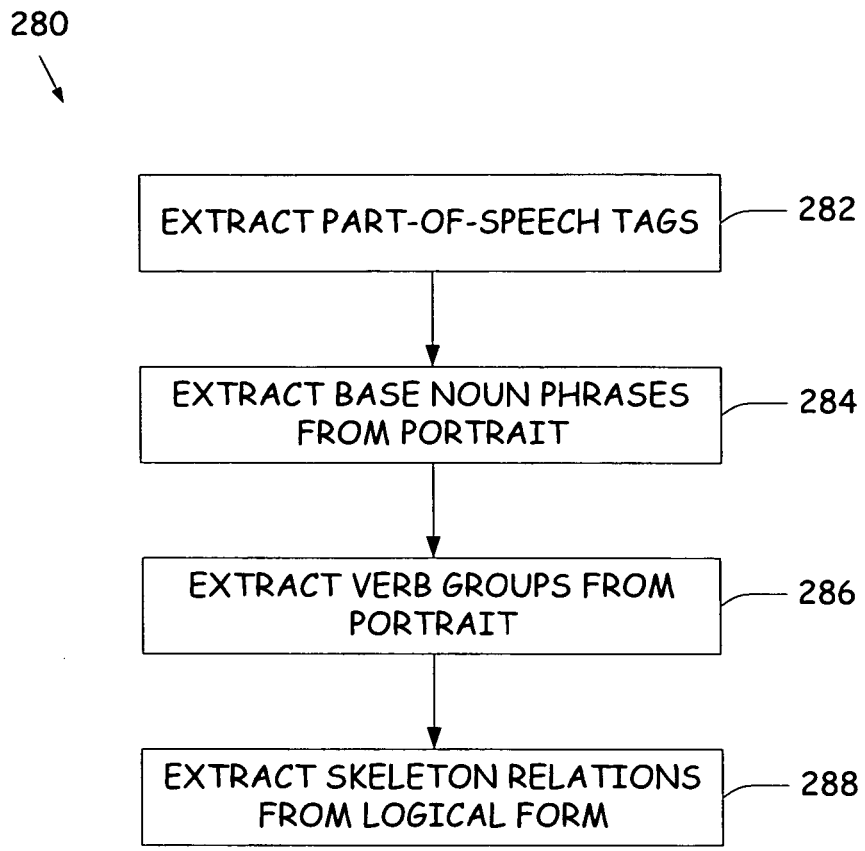
FIG. 6 is a flow diagram of a method for transforming data output by a parser to training data.

FIG. 6 is a flow diagram of an exemplary method 280 for transforming output of a pre-existing parser into training data used for a parser in accordance with an embodiment of the present invention. At step 282, part-of-speech tags are extracted from information contained in both the portrait parse and the logical form of EZParse output. In one embodiment, basic part of speech tags are used, for example the basic part-of-speech tags from the portrait part of EZParse output only. At step 284, noun phrases are extracted from the portrait parse of the EZParse output. In one embodiment, base noun phrases include a noun phrase head along with any pre-modifiers for the noun phrase head. For example, one base noun phrase, "other things" would be extracted from the phrase "among other things" which is found in the portrait output.

Next, at step 286, verb groups are extracted from the portrait output. A verb group includes a head word of a clause and any pre-modifiers. For example, preceding auxiliary verbs and adverbs are included in verb groups. Detecting these verb groups can rely on part-of-speech information as well as a hand-coded list of auxiliary verbs.

Figure 7:
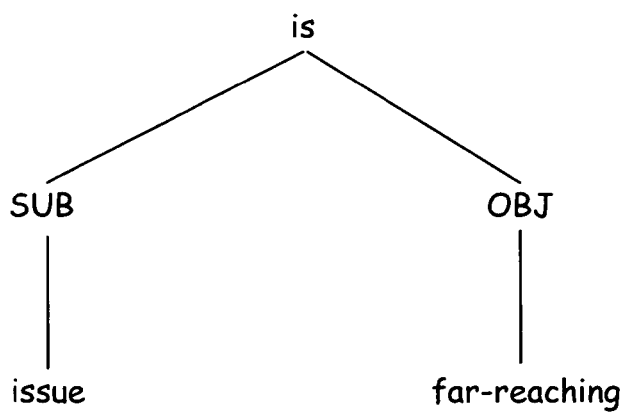
FIG. 7 is an exemplary skeleton relation.

At step 288, skeleton relations from the logical form are extracted. The skeleton relation is a word pair consisting of a predicate head word and its corresponding argument head word, and also an associated label that is the relation between the pair. Some relations are extracted verbatim from the EZParse logical form output. Others can be transformed into relations that are defined as skeleton relations. One transformation includes replacing a direct link between a subject and an object in a predicative constructions with two links, wherein one links the subject and the other links the object with a verb. For example, FIG. 7 illustrates the transformation from the logical form of FIG. 5B to skeleton relationships. The word pair "issue" and "far-reaching" are linked by the label "is". If desired, the skeleton relations can be hand corrected for greater accuracy of the parser.

Figure 8:
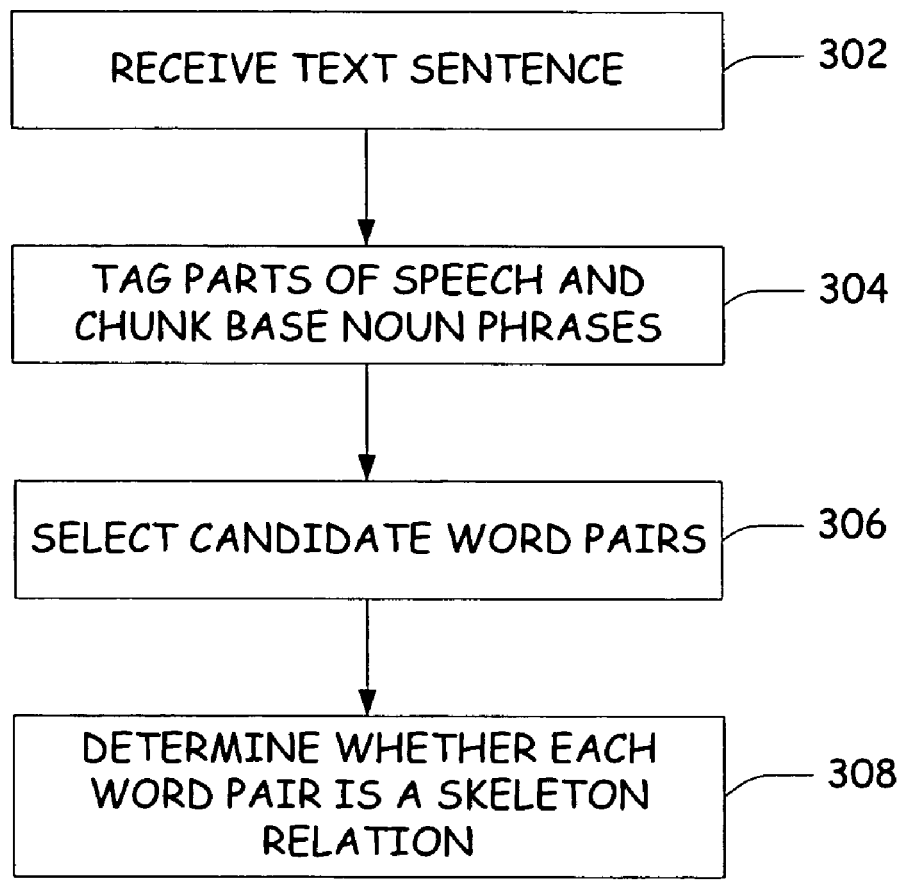
FIG. 8 is a flow diagram of a method for parsing a sentence.

FIG. 8 is an exemplary method 300 for parsing a sentence using the skeleton parser in accordance with an embodiment of the present invention. At step 302, a text sentence is received. Using the skeleton parser, parts of speech are tagged and base noun phrases are identified (or chunked) in the text sentence (step 304). The tagging and identification is performed in accordance with the models that result from the training of the parser described with respect to FIG. 6.

At step 306, candidate skeleton word pairs are selected based on the parts of speech and the chunking of base noun phrases. Verbs in a sentence outside base noun phrases can be candidate predicate head words. Nouns and adjectives can be candidate argument head words, excluding non-headwords inside base noun phrases. Candidate predicate argument word pairs can also be subject to a restriction that a verb cannot occur between the predicate and argument.

At step 308, a determination is made as to whether each candidate word pair is a skeleton relation. This determination can be made using a so-called maximum entropy (ME) model. The model makes this determination by using features describing the candidate predicate and argument. These features include features from the input sentence as well as features from part-of-speech tagging and base NP chunking from step 304. For example, features include the predicate headword and its part of speech and the argument headword and its part of speech. Additionally, there are features specifying headwords and part-of-speech tags surrounding the candidate predicate and argument, for example, a distance between headwords or a number of chunks to a headword. Other features consider the predicate and argument together, for example, whether the predicate or argument occurs first, the number of punctuations between the predicate and argument and the sequence of parts-of-speech of chunk headword between the predicate and the argument.

The ME model is an exponential model that can learn to find skeleton relations given the output of the part-of-speech tagger and base noun phrase chunker of the skeleton parser. The exponential model that is used is shown below as equation 1:

$$p(h, t) = \pi\mu \prod_{j=1}^{k} \alpha_j^{f_j(h,t)} \quad (1)$$

In equation 1, h is a candidate word pair and its surrounding context, t is a prediction, and f1, ..., fk are characteristic functions each corresponding to a possible feature value holding in h and value of t. p(h,t) is the probability of h and t as determined by the ME model. It will further be appreciated that alternative components can be used for the ME model, such as different part-of-speech tags, distances between predicate and argument, etc. in accordance with the present invention. Moreover, the ME model may be replaced with other machine learning models, also in accordance with the present invention.

A central aspect of the skeleton parser described above is that the parser is trained on the output of a pre-existing parser, currently embodied by EZParse, a hand-crafted parser. A key advantage of this approach is that training data can be obtained without costly human-annotation. When the skeleton parser is trained with enough (easily-obtainable) data, the resulting parser has increased accuracy over the original EZParse parser. Use of the skeleton parser in applications that need skeleton relations is preferable to use of EZParse because the former is more than five times as fast.

Furthermore, learning more complex features rather than less complex ones from noisy data can increase the skeleton parser's accuracy. For example, using complex part-of-speech tags as features, though noisier, can be more effective than using simple part-of-speech tags. Additionally, a ME model can achieve high accuracy in finding grammatical relations. Also, experiments in selecting which features are to be used in the ME model can enhance the development of the skeleton parser. Features related to the candidate predicate and argument by their relative positions and by feature type, either word or part-of-speech, can serve to increase model accuracy.

Although the present invention has been described with reference to particular embodiments, workers skilled in the art will recognize that changes may be made in form and detail without departing from the spirit and scope of the invention.

What is claimed is:

1. A computer-implemented method for developing a parser, comprising:
   accessing a corpus of sentences;
   parsing the sentences with a computer to generate a structural description of each sentence using an existing parser, each structural description identifying noun phrases and a verb phrase from its corresponding sentence;
   transforming each structural description to a skeleton relation that only identifies one relationship between one subject and one verb in the skeleton relation's corresponding structural description's corresponding sentence, and one other relationship between one subject and the one verb in the skeleton relation's corresponding structural description's corresponding sentence;
   training another parser based on only the skeleton relations transformed from each structural description for use in identifying skeleton relations from sentences independent from the corpus of sentences;
   utilizing said another parser to parse another corpus of sentences.

2. The method of claim 1 and further comprising using part-of-speech tags to generate the structural descriptions.

3. The method of claim 1 wherein the existing parser is a hand-crafted parser.

4. The method of claim 1 and further comprising generating a maximum entropy model to identify skeleton relations in a sentence outside of the corpus of sentences.

5. The method of claim 1 wherein the noun phrases comprises a first noun phrase including a subject and a second noun phrase comprising an object wherein transforming includes replacing a link in the structural description between the first noun phrase including the subject and the second noun phrase including the object with two links, one link between the subject and a verb and the other link between the object and the verb.

6. A non-transitory computer-readable storage medium having instructions that develop a parser for use in natural language processing, the instructions comprising:
   an existing parser comprising a statistical parser that parses a corpus of sentences and generates a structural description of each sentence, each structural description identifying noun phrases and a verb phrase from its corresponding sentence
   a training module transforming each structural description to a skeleton relation that only identifies one relationship between one subject and one verb in the skeleton relation's corresponding structural description's corresponding sentence, and one other relationship between one subject and the one verb in the skeleton relation's corresponding structural description's corresponding sentence; and training another parser based only on the skeleton relations transformed from each structural description for use in identifying skeleton relations from sentences independent from the corpus of sentences.

7. The non-transitory computer readable storage medium of claim 6 wherein the training module is adapted to use part-of-speech tags to generate the structural descriptions.

8. The non-transitory computer readable storage medium of claim 6 wherein the existing parser is a hand-crafted parser.

9. The non-transitory computer readable storage medium of claim 6 wherein the training module utilizes a maximum entropy model to identify skeleton relations in a sentence.

10. The non-transitory computer readable storage medium of claim 6 wherein the training module is adapted to replace a link in the structural description between a subject and an object with two links, one link between the subject and a verb and the other link between the object and the verb.

11. A computer-implemented method for developing a parser, comprising:
    accessing a corpus of sentences;
    parsing the sentences with a computer to generate a structural description of each sentence using an existing parser, each structural description identifying noun phrases and a verb phrase from its corresponding sentence;
    transforming each structural description to a corresponding skeleton relation that only identifies one relationship between one subject and one verb in the skeleton relation's corresponding structural description's corresponding sentence, and one other relationship between one subject and the one verb in the skeleton relation's corresponding structural description's corresponding sentence by replacing a link in the skeleton relation's corresponding structural description between a subject and an object with two links, one link between the subject and the verb and the other link between the object and the verb;

training another parser based on only the skeleton relations transformed from each structural description for use in identifying skeleton relations from sentences independent from the corpus of sentences;

utilizing said another parser to parse another corpus of sentences to identify skeleton relations therein.

\* \* \* \* \*